No. 675,231. Patented May 28, 1901.
E. E. MAXON.
DRAFT EQUALIZER.
(Application filed Jan. 9, 1901.)
(No Model.)
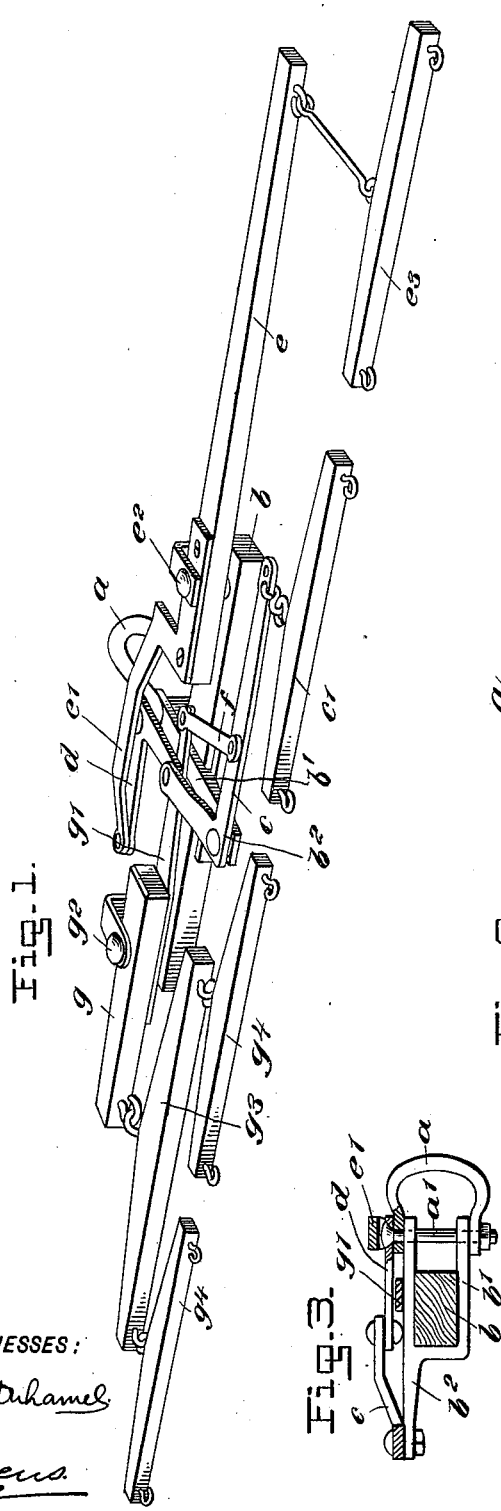
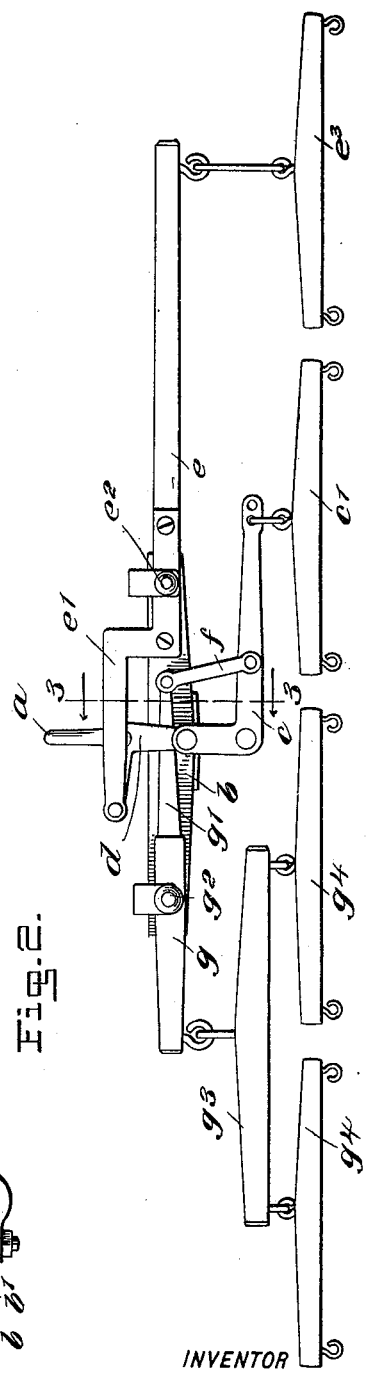
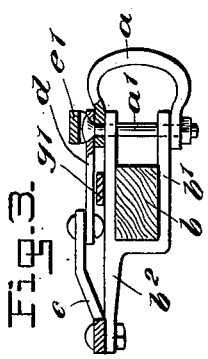
WITNESSES:
James F. Duhamel
T. B. Owens
INVENTOR
Edward E. Maxon
BY
ATTORNEYS
THE NORRIS PETERS CO., PHOTO-LITHO., WASHINGTON, D. C.

United States Patent Office.

EDWARD E. MAXON, OF ABBOTT, NEBRASKA.

DRAFT-EQUALIZER.

SPECIFICATION forming part of Letters Patent No. 675,231, dated May 28, 1901.

Application filed January 9, 1901. Serial No. 42,644. (No model.)

*To all whom it may concern:*

Be it known that I, EDWARD E. MAXON, a citizen of the United States, and a resident of Abbott, in the county of Hall and State of Nebraska, have invented a new and Improved Draft-Equalizer, of which the following is a full, clear, and exact description.

This invention relates to a draft-equalizer intended for use in connection with four horses and by which to enable this number of horses to be hitched to a plow or harvester in such a way that all four of the horses may work on unplowed ground in the case of a plow and on stubble-ground in case of a harvester.

This specification is the specific description of one form of the invention, while the claims are definitions of the actual scope thereof.

Reference is to be had to the accompanying drawings, forming a part of this specification, in which similar characters of reference indicate corresponding parts in all the views.

Figure 1 is a perspective view of the invention. Fig. 2 is a plan view thereof, and Fig. 3 is a section on the line 3.3 of Fig. 2.

$a$ represents a clevis or other device adapted to be connected to the implement to be drawn. This clevis is attached to the main beam $b$ of the equalizer by means of a bolt $a'$, which is engaged with the ends of a U-shaped clip $b'$, mounted on the beam $b$. The clip $b'$ has a forwardly-projecting arm $b^2$, on which is fulcrumed an elbow-lever $c$, the long arm of which projects transversely and the short arm of which projects rearwardly. The long arm of the lever $c$ carries a singletree $c'$, to which one of the horses is hitched.

Fulcrumed on the upper end of the pin $a'$ is an elbow-lever $d$, one arm of which extends forwardly to and is pivotally connected with the short arm of the lever $c$. The other end of the elbow-lever $d$ projects transversely opposite to the direction in which the long arm of the lever $c$ projects, and this second arm of the lever $d$ is connected to an arm $e'$, fastened to and forming part of a lever $e$, fulcrumed to the main beam $b$ at the point $e^2$. The outer end of the lever $e$ carries a singletree $e^3$.

A link $f$ is pivotally connected to the long arm of the lever $c$ and extends rearward into connection with an arm $g'$, which is fastened to and forms part of a lever $g$, fulcrumed to the main beam $b$ at the point $g^2$, the outer or opposite end of the lever $g$ carrying a doubletree $g^3$, which in turn carries singletrees $g^4$.

From the foregoing description it will be apparent that strain communicated to one of the singletrees will cause the other singletrees to shift their positions correspondingly, and thus the horses are kept even and the draft properly distributed. By fastening the clevis $a$ to the plow at a point slightly at one side of the longitudinal line of the plow-beam the horses hitched to the inner singletree $g^4$ and the singletrees $c'$ and $e^3$ may be driven on the unplowed ground, and the horse hitched to the outer singletree $g^4$ may be driven in the furrow. Therefore none of the horses will be forced to walk on the plowed ground. The same result follows the use of the apparatus on a harvester—*i. e.*, all of the horses may be driven on the stubble.

Having thus described my invention, I claim as new and desire to secure by Letters Patent—

1. A draft-equalizer, comprising the combination with a main beam, of an elbow-lever fulcrumed thereon and adapted to have a singletree attached, two straight levers fulcrumed on the main beam adjacent to the respective ends thereof, the first of said straight levers being adapted to carry one singletree and the second of said straight levers being adapted to carry two singletrees, a link extending between the elbow-lever and the second of said straight levers, and a second elbow-lever connected with the first elbow-lever and with the first straight lever.

2. In a draft-equalizer, the combination with a main beam or body member, of three levers mounted thereon, one of said levers being bent and fulcrumed approximately at its elbow, and connections extending respectively from the other two levers and joined to the bent lever at opposite sides of the fulcrum thereof.

3. In a draft-equalizer, the combination with the main beam or body member, of three whiffletree-carrying levers mounted thereon, the middle of said levers being bent and fulcrumed approximately at its elbow, a link connected to the bent lever at one side of its fulcrum and also connected with the inner end of one of the other whiffletree-carrying levers, and a second elbow-lever connected to the remaining whiffletree-carrying lever and to the first-named bent lever at the side of its fulcrum opposite the link, the said second elbow-lever being mounted on said main beam or body member.

4. In a draft-equalizer, the combination with the main beam or body member adapted to be connected to the apparatus to be drawn, of three whiffletree-carrying levers independently mounted on the main or body member, and a connection extending from each end of the middle lever respectively to the adjacent ends of the remaining levers.

In testimony whereof I have signed my name to this specification in the presence of two subscribing witnesses.

EDWARD E. MAXON.

Witnesses:
HY. J. BRETENBACH,
T. W. BUNCH.